J. Brayley.
Shaft-Coupling.
Nº 73293. Patented Jan. 14, 1868.
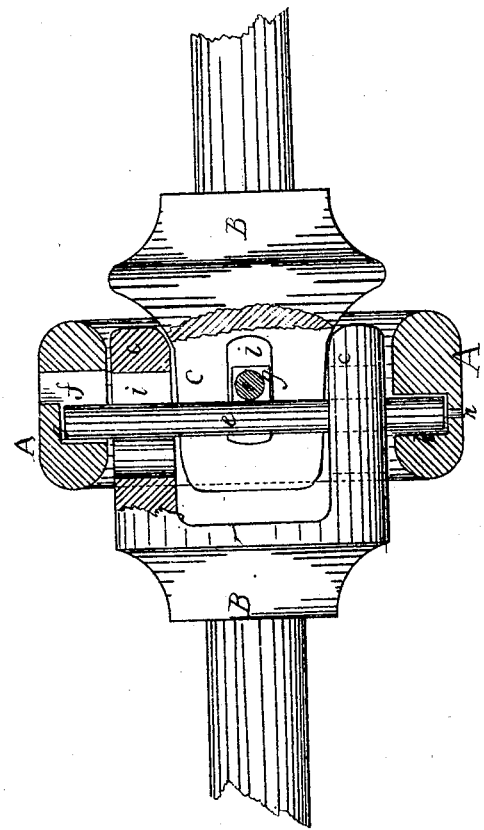
Witnesses:
Geo. W. Miatt
Lewis Fraser
Inventor·
James Brayley
by J. Fraser & Co.
Atty's

United States Patent Office.

JAMES BRAYLEY, OF BUFFALO, NEW YORK.

Letters Patent No. 73,293, dated January 14, 1868.

---

IMPROVEMENT IN SHAFT-COUPLING.

---

The Schedule referred to in these Letters Patent and making part of the same.

---

TO ALL WHOM IT MAY CONCERN:

Be it known that I, JAMES BRAYLEY, of the city of Buffalo, in the county of Erie, and State of New York, have invented a new and useful Improvement in Shaft-Couplings; and I do hereby declare that the following is a full and exact description thereof, reference being had to the accompanying drawing, which is a view of my improved coupling, shown partially in section.

My improvement relates to a common kind of coupling, employed in connecting together the ends of shafts designed to revolve in the same line.

This usually consists of a ring or box (represented by A in the drawing) in which the two wrists B B, at the ends of the shafts, are secured by two bolts, which pass respectively through the ring and the two bearings $c\ c$ of each wrist, at right angles to each other, the said bolts being provided with a head at one end, while the other projects through the ring on the opposite side, where it has been customarily fastened by a key. The projecting ends of these bolts have been frequently the causes of accidents—sometimes fatal ones—which resulted from the injured person's clothes getting caught and entangled therein. Especially has this been the case with the couplings of the "tumbling-rods" (as they are called) of threshing-machines, and other connections, near which the attendants or operators have frequently to pass.

It is the object of my invention to overcome this liability to accidents occurring from the foregoing cause. This I accomplish by so constructing the coupling-ring that bolts without heads or keys may be inserted therein, and securely retained in place, without either of their ends projecting beyond the surface of the ring, as will presently be clearly explained.

To admit of the insertion of the two bolts $e\ e$, I cast, or otherwise form in the ring A, radial holes, $f$, at right angles to each other, having a lateral recess, $g$, which does not quite extend through the outer surface of the ring. In the inner side of the ring, opposite these recesses, are formed sockets, $h$, in which fit the advance ends of the bolts $e$, after they have been introduced through the holes $f$ and the slots $i$, in the bearings or arms $c\ c$, while the rear ends fall to one side, in the recess $g$. These recesses are preferably made on the side next to the end of the shaft, which is to be fastened by the bolt fitting therein, so that the action of the shafts, in their tendency to separate, will keep the bolts in their respective recesses. A small hole, $n$, may be made from the base of the sockets $h$, through the ring, as shown, in which a nail or other small instrument can be inserted, to force the bolts out, when the shafts are required to be uncoupled.

The great advantage of my improvement, as before stated, is the security it affords against accidents from the garments of the attendants or operators getting entangled around the coupling, as by my improved construction there are no projecting parts, as in the old method, to catch the clothes. It also renders the coupling less expensive, as a simple section of a rod can be employed to couple the parts, instead of using a finished bolt provided with a head, and a slot for the key, as is required in the old method.

What I claim as my invention, is—

Providing the guard-ring A with concealed recesses, $g\ h$, on its interior surface, for receiving the ends of the loose pins $e\ e$, in combination with the holes $f$ and openings $i\ i$, of the forked heads B, constructed and arranged substantially as and for the purposes set forth.

In witness whereof, I have hereunto signed my name, in the presence of two subscribing witnesses.

JAMES BRAYLEY.

Witnesses:
 JAY HYATT,
 ALBERT HAIGHT.